(12) United States Patent
Kim et al.

(10) Patent No.: US 9,996,964 B2
(45) Date of Patent: Jun. 12, 2018

(54) APPARATUS, METHOD AND COMPUTER PROGRAM FOR GENERATING CARTOON CONTENT

(71) Applicant: NAVER CORPORATION, Seongnam-si (KR)

(72) Inventors: Hyo Kim, Seongnam-si (KR); Hyun Chul Lee, Seongnam-si (KR); Ji Han Kim, Seongnam-si (KR); Dai Hyun Lim, Seongnam-si (KR); Byoung Kwan Kim, Seongnam-si (KR)

(73) Assignee: NAVER Corporation, Seongnam-si (KR)

(*) Notice: Subject to any disclaimer, the term of this patent is extended or adjusted under 35 U.S.C. 154(b) by 283 days.

(21) Appl. No.: 14/995,419

(22) Filed: Jan. 14, 2016

(65) Prior Publication Data

US 2016/0284114 A1  Sep. 29, 2016

(30) Foreign Application Priority Data

Mar. 25, 2015 (KR) .................... 10-2015-0041653

(51) Int. Cl.
*G06T 13/80* (2011.01)
*G06T 15/02* (2011.01)
*G06T 15/50* (2011.01)

(52) U.S. Cl.
CPC .............. *G06T 13/80* (2013.01); *G06T 15/02* (2013.01); *G06T 15/503* (2013.01)

(58) Field of Classification Search
CPC .................................................... G06T 13/80
(Continued)

(56) References Cited

U.S. PATENT DOCUMENTS

2002/0149622 A1* 10/2002 Uesaki .................... G06T 13/20
715/764
2003/0210283 A1* 11/2003 Ishii ........................ G06F 3/038
715/848

(Continued)

FOREIGN PATENT DOCUMENTS

JP  2000194871  7/2000
JP  2003062239  3/2003
(Continued)

OTHER PUBLICATIONS

Japanese Office Action dated Feb. 14, 2017 of the corresponding Japanese Patent application No. 2016-017269.

*Primary Examiner* — Mark Zimmerman
*Assistant Examiner* — Jonathan M Cofino
(74) *Attorney, Agent, or Firm* — Greer Burns & Crain Ltd.

(57) ABSTRACT

An apparatus for generating cartoon content includes a cut input controller configured to control inputting of a signal of adding a cut comprising one or more layers; an effect input controller configured to control inputting of a plurality of effects applied to a first layer among the one or more layers and receiving of property information such that directing of the plurality of effects interact with each other; and a cut generator configured to determine at least one of a directing start time, a directing end time, and a directing speed of the plurality of effects such that the plurality of effects interact with each other and are displayed, and generate a first final cut such that the plurality of effects are expressed according to the property information, wherein the effect input controller enters an input that sets the property information of the plurality of effects to be synchronized with the plurality of effects, and wherein the cut generator generates the first final cut such that a directing start time, a directing end time, or a directing time of a first effect among the plurality of (Continued)

effects is synchronized with a directing start time, a directing end time, or a directing time of one or more effects excluding the first effect.

9 Claims, 8 Drawing Sheets

(58) Field of Classification Search
 USPC .......................................................... 345/474
 See application file for complete search history.

(56) References Cited

U.S. PATENT DOCUMENTS

| | | | |
|---|---|---|---|
| 2008/0034292 A1* | 2/2008 | Brunner | G06T 13/00 715/700 |
| 2014/0132789 A1* | 5/2014 | Koyama | G06T 13/80 348/218.1 |

FOREIGN PATENT DOCUMENTS

| | | |
|---|---|---|
| JP | 2005-135106 A | 5/2005 |
| KR | 10-2011-0049257 A | 5/2011 |
| KR | 10-2011-0096957 A | 8/2011 |
| KR | 10-1108480 B1 | 1/2012 |
| KR | 10-2013-0107895 A | 10/2013 |

* cited by examiner

APPARATUS, METHOD AND COMPUTER PROGRAM FOR GENERATING CARTOON CONTENT

CROSS-REFERENCE TO RELATED APPLICATIONS

This application claims the benefit of Korean Patent Application No. 10-2015-0041653, filed on Mar. 25, 2015, in the Korean Intellectual Property Office, the disclosure of which is incorporated herein in its entirety by reference.

BACKGROUND

1. Field

One or more exemplary embodiments of the present invention relate to an apparatus, method, and computer program for generating cartoon content and a method of displaying the cartoon content, and more particularly, to an apparatus, method, and computer program for generating cartoon content in which a plurality of effects included in a layer of the cartoon content interact with each other.

2. Description of the Related Art

A cartoon is a picture intended to satirize or criticize life or society by exaggerating or omitting the features of an object and using humor, caricature, social commentary, etc. Cartoons may be classified into various types, e.g., a romance cartoon, a martial arts cartoon, an action cartoon, a comic cartoon, a sports cartoon, a science fiction (SF) cartoon, etc., according to the contents thereof. A cartoon may show complex human attitudes using a visual system of pictures (images) and characters (text), and is thus more effective to attract the attention of readers than a general book containing only characters.

Recently, with the advancement in communication technology, cartoons have been provided not only through comic books but also via the Internet or the like.

SUMMARY

One or more exemplary embodiments of the present invention provide an apparatus, method, and computer program for generating cartoon content as intended by a cartoon content creator.

One or more exemplary embodiments provide an apparatus, method, and computer program for generating cartoon content in which a directing start time and a directing speed of a first effect and a second effect that are included in one layer among the cartoon content interact with each other as designated by a cartoon content creator.

Additional aspects will be set forth in part in the description which follows and, in part, will be apparent from the description, or may be learned by practice of the presented embodiments.

According to one or more exemplary embodiments, an apparatus for generating cartoon content includes a cut input controller configured to control inputting of a signal of adding a cut including one or more layers; an effect input controller configured to control inputting of a plurality of effects applied to a first layer among the one or more layers and receiving of property information such that directing of the plurality of effects interact with each other; and a cut generator configured to determine at least one of a directing start time, a directing end time, and a directing speed of the plurality of effects such that the plurality of effects interact with each other and are displayed, and generate a first final cut such that the plurality of effects are expressed according to the property information, wherein the effect input controller enters an input that sets the property information of the plurality of effects to be synchronized with the plurality of effects, and wherein the cut generator generates the first final cut such that a directing start time, a directing end time, or a directing time of a first effect among the plurality of effects is synchronized with a directing start time, a directing end time, or a directing time of one or more effects excluding the first effect.

According to one or more exemplary embodiments, an apparatus for generating cartoon content includes a cut input controller configured to control receiving of a signal of adding a cut including one or more layers; an effect input controller configured to control receiving of a first effect and a second effect that are applied to a first layer among the one or more layers and receiving of a directing start time, a directing end time, or a directing time of the first effect and the second effect; and a cut generator configured to generate a first final cut such that the first layer interacts with the first effect while expressing the first effect, wherein the effect input controller enters an input that sets the directing speed of the second effect as a first speed that interacts with the directing speed of the first effect, and wherein the cut generator generates the first final cut such that the directing speed of the second effect is directed as the first speed.

When the directing start time of the second effect is the same as the directing start time of the first effect, the effect input controller may set the directing speed of the second effect as a second speed synchronized with the directing speed of the first speed.

The effect input controller may control receiving of a third effect applied to a second layer among the one or more layers, and wherein the cut generator may generate a second final cut such that the second layer expresses the third effect in order to interact the third effect with at least one of the first effect and the second effect.

The directing speed of the second effect may be changed from the first speed to the second speed that does not interact with the first effect after a time.

The effect input controller may receive a third effect applied to the first layer and receive an input that sets the directing speed of the second effect as a third speed that interacts with the directing speed of the first effect and the third effect.

According to one or more exemplary embodiments, a method of generating cartoon content includes inputting a signal of adding a cut including one or more layers, wherein a cut input controller performs the receiving; inputting a first effect and a second effect that are applied to a first layer among the one or more layers and receiving a directing start time or a directing time of the first effect and the second effect, wherein an effect input controller performs the receiving; and generating a first final cut such that the first layer interacts with the first effect while expressing the first effect, wherein a cut generator performs the generating, wherein the receiving of the first effect and the second effect includes: inputting an input that sets the directing speed of the second effect as a first speed that interacts with the directing speed of the first effect, and wherein the generating of the first final cut includes: generating the first final cut such that the directing speed of the second effect is directed as the first speed.

The inputting of the first effect and the second effect may include, when the directing start time of the second effect is the same as the directing start time of the first effect, setting the directing speed of the second effect as a second speed synchronized with the directing speed of the first speed.

The inputting of the first effect and the second effect may include: receiving a third effect applied to a second layer among the one or more layers, and wherein the generating of the first final cut may include: generating a second final cut such that the second layer expresses the third effect in order to interact the third effect with at least one of the first effect and the second effect.

The directing speed of the second effect may be changed from the first speed to the second speed that does not interact with the first effect after a time.

The directing speed of the second effect may be changed from a second speed that does not interact with the first effect to the first speed after a time.

According to one or more exemplary embodiments, there are provided other methods and systems for accomplishing the inventive concept, and a non-transitory computer-readable recording medium having recorded thereon a computer program for performing the other methods.

BRIEF DESCRIPTION OF THE DRAWINGS

These and/or other aspects will become apparent and more readily appreciated from the following description of the embodiments of the present invention, taken in conjunction with the accompanying drawings in which.

DETAILED DESCRIPTION

Reference will now be made in detail to embodiments of the present invention, examples of which are illustrated in the accompanying drawings, wherein like reference numerals refer to like elements throughout. In this regard, the present embodiments may have different forms and should not be construed as being limited to the descriptions set forth herein. Accordingly, the exemplary embodiments are merely described below, by referring to the figures, to explain aspects of the present description. Expressions such as "at least one of," when preceding a list of elements, modify the entire list of elements and do not modify the individual elements of the list.

It will be understood that although the terms 'first', 'second,' etc. may be used herein to describe various components, these components should not be limited by these terms. These components are only used to distinguish one component from another.

As used herein, the singular forms 'a', 'an' and 'the' are intended to include the plural forms as well, unless the context clearly indicates otherwise.

It will be further understood that the terms 'comprise' and/or 'comprising' used herein specify the presence of stated features or components, but do not preclude the presence or addition of one or more other features or components.

When a certain embodiment may be implemented differently, a specific process order may be performed differently from the described order. For example, two consecutively described processes may be performed substantially at the same time or performed in an order opposite to the described order.

The term 'cartoon content' may mean data created by a cartoon content creator and a cartoonist. A piece of the cartoon content may be configured to include at least one cut. The term 'cut' may mean data containing one scene and may include at least one layer including an image or text. The cartoon content may individually include each cut as an image file or may include one image file including all of the at least one cut.

The term 'display region' is a region of the cartoon content that is shown to a user through a display unit or the cartoon content displayed in response to a user request on the region. The cartoon content may correspond to and move according to user events that are input by the user. The display region may be changed according to the movement of the cartoon content, and accordingly the displayed cartoon content may also be changed.

The term 'effect' indicates an animation operation that is contained in the whole of the cartoon content or a part thereof and is contained in a layer or a cut. In more detail, the effect includes a movement of a layer, division, going down, going up, expansion, a slow movement, a fast movement, an operation causing a color change, a perspective effect of a cut, a movement of a time difference, rotation, transparent processing, rescaling, and setting a clipping region but is not limited thereto. A different type of an effect may also be included. Property information of the effect may be related to directing of the effect and may include a directing start time, a directing speed, whether directing is delayed, rotation angle information, and location information.

Figure 1:
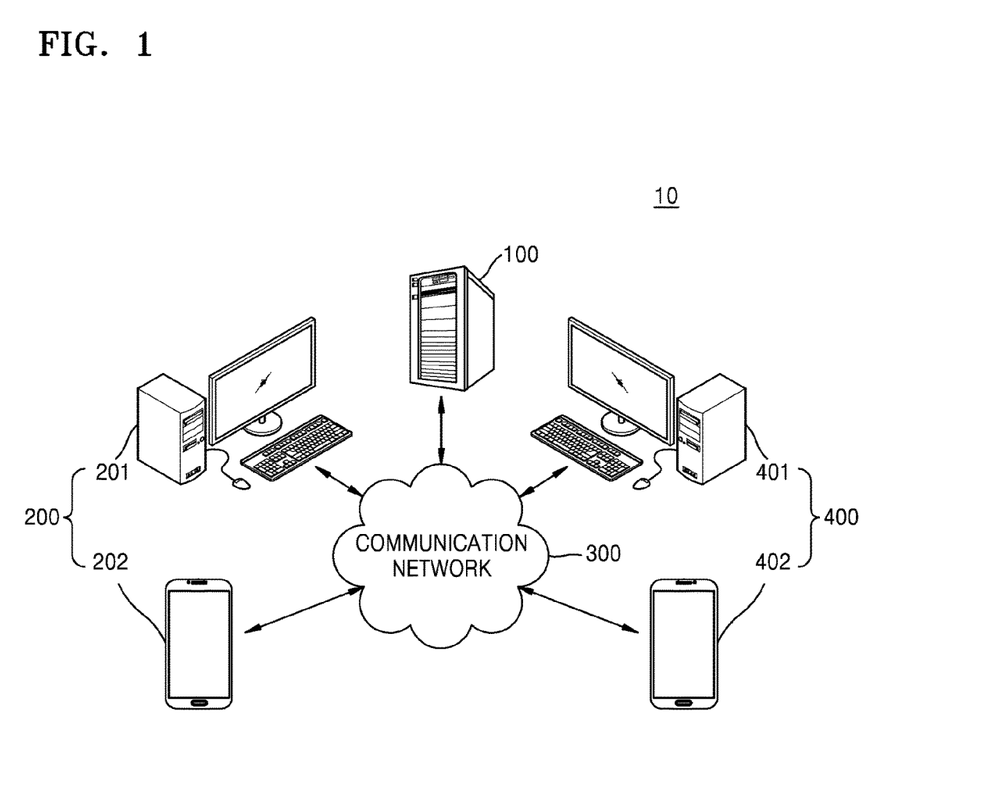
FIG. 1 is a diagram of a cartoon content providing system according to an exemplary embodiment.

FIG. 1 is a diagram of a cartoon content providing system 10 according to an exemplary embodiment.

Referring to FIG. 1, the cartoon content providing system 10 according to the exemplary embodiment includes a cartoon content server 100, a cartoon content generation apparatus 200, a communication network 300, and a cartoon content display apparatus 400.

The cartoon content server 100 provides cartoon content display application to the cartoon content display apparatus 400. The cartoon content server 100 may provide the cartoon content classified according to authors, episodes, works, and days and may provide works that have been completely published. The cartoon content server 100 may selectively provide the cartoon content according to a request from the cartoon content display apparatus 400. The cartoon content server 100 may receive and store cartoon content generated by the cartoon content generation apparatus 200.

The cartoon content generation apparatus 200 provides means for generating the cartoon content to a cartoon content creator (for example, a cartoonist). The cartoon content generation apparatus 200 may provide a user interface for conveniently generating 2D cartoon content. The cartoon content generation apparatus 200 may provide a function of generating one or more cuts included in the cartoon content, a function of generating one or more layers included in the cuts, or an effect input function of applying an effect to the layers. The cartoon content generation apparatus 200 may provide a function of changing and generating a layer having the effect such that the effect may be appropriately provided to a user with respect to the layer. Here, the user is the person who create the cartoon data.

The cartoon content generation apparatus 200 may provide means for setting a plurality of effects to a cut or a layer and interacting with directing of the plurality of effects. That is, the cartoon content generation apparatus 200 may receive a directing start time, a directing speed, and/or a directing end time of a second effect such that directing of a first effect and the second effect that are set for one layer may interact with each other, and generate a layer or a cut such that the second effect may interact with the first effect according to property information of an input effect. In particular, the cartoon content generation apparatus 200 may generate the layer directed to interact with a plurality of effects set in one layer through a setup to synchronize the plurality of effects.

The cartoon content providing system 10 has plurality of cartoon content generation apparatuses 200. The plurality of cartoon content generation apparatuses 200 may mean communication terminals using a web service in a wired/wireless communication environment. In this regard, the cartoon content generation apparatus 200 may be a personal computer 201 of the user or a mobile terminal 202 of the user. The mobile terminal 202 is illustrated as a smart phone in FIG. 1 but the exemplary embodiments are not limited thereto. As described above, a terminal having an application capable of web browsing embedded therein may be employed without limitation.

In more detail, the cartoon content generation apparatus 200 may include a computer (e.g., a desktop computer, a laptop computer, a tablet PC, etc.), a media computing platform (e.g., a cable, a satellite set-top box, a digital video recorder, etc.), a handheld computing device (e.g., a PDA, an email client, etc.), any type of a mobile phone, or other types of computing or communication platforms, but the exemplary embodiments are not limited thereto.

The cartoon content display apparatus 400 may be an apparatus that displays the cartoon content received from the cartoon content server 100 or stored cartoon content in correspondence with a user event. In this regard, the cartoon content may be data generated by the cartoon content generation apparatus 200. The cartoon content display apparatus 400 may display the cartoon content from a first cut to a last cut on one page or on a plurality of pages. The cartoon content display apparatus 400 may move the cartoon content in correspondence with the user event, change a display region displayed on a display of the cartoon content display apparatus 400, and display the cartoon content. The cartoon content display apparatus 400 may display a layer including two or more effects to interact with the first effect and the second effect according to directing start time and directing speed of the first effect and the second effect.

The cartoon content display apparatus 400 may adjust a moving speed of the cartoon content according to information (types and number of effects, types and number of layers, number of words included in text, etc.) regarding the user event and a cut included in a currently displayed first region, an average reading speed of the cartoon content, or an average reading speed of the user, etc. In alternative exemplary embodiments, the cartoon content display apparatus 400 may adjust a moving distance of the cartoon content according to the information regarding the user event and the cut included in the currently displayed first region.

The plurality of cartoon content display apparatuses 400 mean communication terminals using a web service in a wired/wireless communication environment. In this regard, the cartoon content display apparatus 400 may be a personal computer 401 of the user or a mobile terminal 402 of the user. The mobile terminal 402 is illustrated as a smart phone in FIG. 1 but the exemplary embodiments are not limited thereto. As described above, a terminal having an application capable of web browsing embedded therein may be employed without limitation.

In more detail, the cartoon content display apparatus 400 may include a computer (e.g., a desktop computer, a laptop computer, a tablet PC, etc.), a media computing platform (e.g., a cable, a satellite set-top box, a digital video recorder, etc.), a handheld computing device (e.g., a PDA, an email client, etc.), any type of a mobile phone, or other types of computing or communication platforms, but the exemplary embodiments are not limited thereto.

The communication network 300 may connect the plurality of cartoon content display apparatuses 400 and the cartoon content server 100. That is, the communication network 300 may provide connection paths for transmitting and receiving data between the cartoon content display apparatuses 400 and the cartoon content server 100 after the cartoon content display apparatuses 400 access the cartoon content server 100. The communication network 300 may include, for example, wired networks such as local-area networks (LANs), wide-area networks (WANs), metropolitan area networks (MANs), integrated service digital networks (ISDNs), etc. or wireless networks such as wireless LANs, CDMA, Bluetooth, satellite network, etc., but the exemplary embodiments are not limited thereto.

Figure 2:
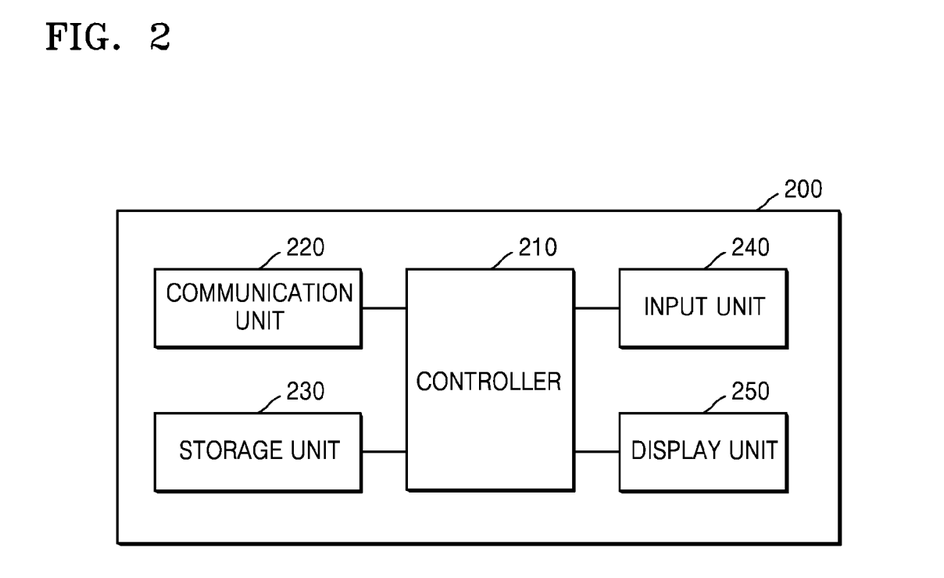
FIG. 2 is a block diagram of a cartoon content generation apparatus according to an exemplary embodiment.

FIG. 2 is a block diagram of the cartoon content generation apparatus 200 according to one exemplary embodiment.

Referring to FIG. 2, the cartoon content generation apparatus 200 according to the exemplary embodiment includes a controller 210, a communication unit 220, a storage unit 230, an input unit 240, and a display unit 250.

The controller 210 may generate one or more image files (hereinafter referred to as layers) that are input through the input unit 240 as final cartoon content in consideration of an input effect, property information of the effect, etc. In particular, the controller 210 may generate cartoon content in which directing of a plurality of effects included in one layer may interact with each other and be expressed through a synchronization option with respect to the plurality of effects. In particular, the controller 210 may generate the cartoon content in which directing of the plurality of effects included in one layer may interact with each other and be expressed by adjusting a directing time or a directing speed of the plurality of effects. The controller 210 may generate the final cartoon content such that a first effect and a second effect that are included in a layer may interact with each other and be expressed according to a directing time and a directing speed of the first effect and the second effect.

The controller 210 should be understood to include various types of devices capable of processing data, e.g., a processor for controlling overall operations of the cartoon content generating apparatus 200. Here, the processor may be a data processing device embedded in hardware and having a circuit physically constructed to execute, for example, code included in a program or a function expressed in the form of a command. Examples of the data processing device embedded in hardware include, but are not limited to, a microprocessor, a central processing unit (CPU), a processor core, a multiprocessor, an application-specific integrated circuit (ASIC), a field programmable gate array (FPGA), etc.

The communication unit 220 may include one or more components that enable communication between the cartoon content generation apparatus 200 and the cartoon content server 100. For example, the communication unit 220 may include a short-distance wireless communication unit or a mobile communication unit. Examples of the short-range wireless communication unit may include, but are not limited to, a Bluetooth communication unit, a Bluetooth low energy (BLE) communication unit, a near-field communication unit, a WLAN (Wi-Fi) communication unit, a Zigbee communication unit, an infrared data association (IrDA) communication unit, a Wi-Fi direct (WFD) communication unit, a ultra-wideband (UWB) communication unit, an Ant+ communication unit, etc. The mobile communication unit may exchange a radio signal with at least one among a base station, an external terminal, and a server in a mobile communication network. The radio signal may include a voice call signal, a video communication call signal, or various types of data via transmission and reception of text/multimedia messages. The communication unit 220 may communicate with the cartoon content server 100 to transmit the cartoon content to the cartoon content server 100 or to obtain an application for generating the cartoon content from the cartoon content server 100.

The storage unit 230 may store the cartoon content obtained through the communication unit 220.

The input unit 240 may be used by a user to input an event or data for controlling the cartoon content generation apparatus 200. For example, the input unit 240 may include a key pad, a dome switch, a touch pad (of a contact capacitive type, a press resistive type, an infrared sensing type, a surface ultrasonic conductive type, an integration tension measurement type, or a piezo effect type), a jog wheel, a jog switch, etc. but is not limited thereto.

The input unit 240 may obtain a user input. For example, the input unit 240 may obtain a user event with respect to the cartoon content, a scroll input, a direction key input, a movable touch input having a predetermined direction.

The display unit 250 may display a user interface for generating the cartoon content. The display unit 250 may display the user event that is input through the input unit 240 and a cut and a layer added by the user according to the user interface. When the display unit 250 is configured with a touch screen in which a touch pad forms a layer structure, the display unit 250 may be used as an input device in addition to an output device. The display unit 250 may include at least one of a liquid crystal display (LCD), a thin film transistor-liquid crystal display (TFT-LCD), an organic light-emitting diode (OLED) display, a flexible display, a 3D display, and an electrophoretic display.

Figure 3:
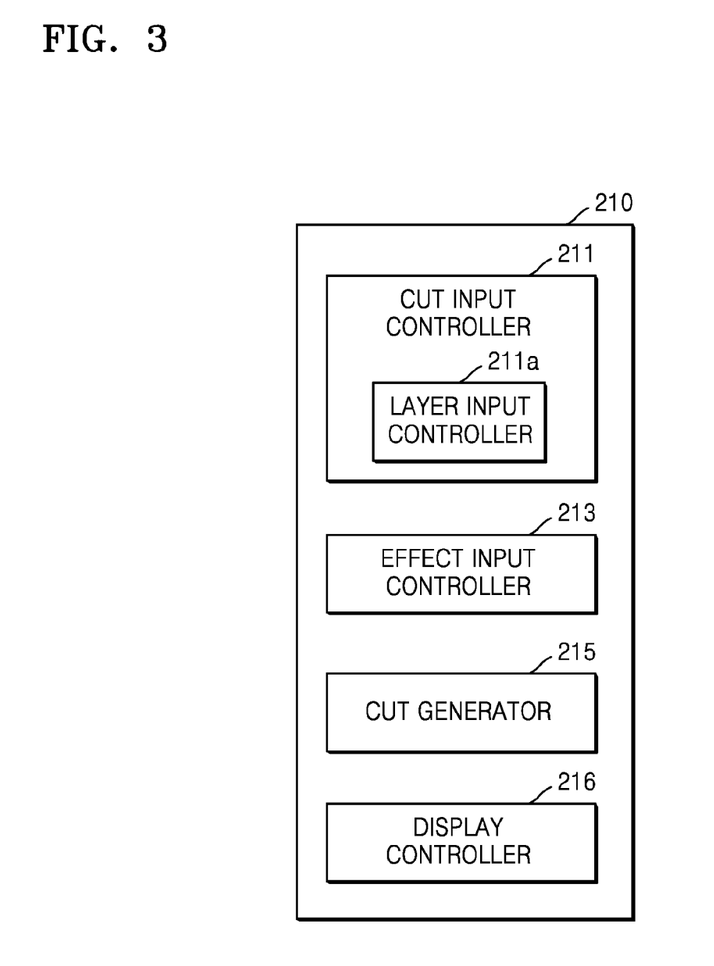
FIG. 3 is a block diagram of a controller of FIG. 2.

FIG. 3 is a block diagram of the controller 210.

Referring to FIG. 3, the controller 210 includes a cut input controller 211, an effect input controller 213, a cut generator 215, and a display controller 216.

The cut input controller 211 may control a cut and property information of the cut, which are to be added by a user, to be input into generated cartoon content. In this regard, the cut may be data included in the cartoon content and may be configured to express one scene among the cartoon content. The cut may include one or more layers. In this regard, the layer may be 2D data included in the cut and include an image or text. The cut or the layer may not include anything. In this case, the cartoon content may be generated such that the cut or the layer may be expressed as a blank.

In another exemplary embodiment, the cut input controller 211 may further include a layer input controller 211a that controls one or more layers that need to be included in a cut added or selected by the user to be input. The layer input controller may control the layers to be included in the cut in correspondence with a layer addition event that occurs by the user.

The cut input controller 211 may control to receive one or more cuts included in one piece of cartoon content. That is, the cut input controller 211 may receive a first cut included in cartoon content and a second cut that is a subsequent cut of the first cut.

The effect input controller 213 may control an effect that needs to be included in the one or more layers included in one cut to be input. In this regard, a type of the input effect and property information related to directing of the input effect may be included. The type of the effect indicates an animation operation included in the layers and may include a movement of the layers, division, going down, going up, expansion, a slow movement, a fast movement, an operation causing a color change, a perspective effect of a cut, a movement set while individual time intervals, rotation, transparent processing, rescaling, and setting a clipping region, but is not limited thereto. The property information of the effect may be information that is related to the directing of the effect and is differently set according to the type of the effect and may include a directing start time, a directing speed, information regarding whether directing is delayed, location information, and rotation angle information.

The effect input controller 213 may control types and property information of a first effect and a second effect that are applied to a first layer among one or more layers included in the first cut to be input and control directing start time and/or directing speed of the first effect and the second effect to be input. In this regard, the directing start time may be a time when directing starts, and may be set as one of, for example, "when a layer or cut appears on a screen", "when a page starts", "simultaneously with a previous effect", and "when a previous effect ends". In this regard, the directing start times "simultaneously with a previous effect" and "when a previous effect ends" may be set only when two or more effects are included in one layer.

The directing speed may be a speed at which a movable effect is directed such as rotation, movement, shaking, etc. and may be set as one of, for example, "slowly", "normal", "fast", "very fast", and "same as a previous effect". In this regard, "same as a previous effect" may be set only when two or more effects are included in one layer.

That is, when the first effect and the second effect are sequentially set in the first layer, the effect input controller 213 may control the directing start time of the second effect to be set as "simultaneously with a previous effect" and control the directing speed of the second effect to be set as "same as a previous effect". In this case, the effect input controller 213 may simultaneously start directing of the second effect and directing of the first effect included in the first layer and may generate a layer such that the directing speed of the second effect may be synchronized with the directing speed of the first effect. Accordingly, the cartoon content generation apparatus 200 according to the exemplary embodiments may allow the first effect and the second effect to be directed simultaneously at the synchronized speed, and may synchronize directing of the first effect and second effect without further consideration of the first effect and the second effect, for example, a rotation angle, a moving speed, a shaking degree, etc. by allowing a cartoon content creator to include two or more effects in one layer and to interact the two or more effects with each other.

The effect input controller 213 may control property information used to synchronize a plurality of effects applied to the first layer among the one or more layers included in the first cut to be input. That is, the effect input controller 213 may set the property information of the plurality of effects as synchronization directing so that the plurality of effects may interact with each other and may be directed.

In other exemplary embodiments, the effect input controller 213 may set directing of an effect included in a layer to be synchronized with directing of an effect included in another cut or directing of an effect included in a different layer from the layer. In more detail, the effect input controller 213 may set directing of the second effect included in the first layer included in the first cut to be synchronized with a third effect included in a second layer included in the second cut. That is, the effect input controller 213 may set a directing start point of the second effect included in the first layer included in the first cut to be the same as a directing start time of the third effect and may set a directing speed of the second effect to be synchronized with a directing speed of the third effect. The effect input controller 213 may set the directing of the second effect included in the first layer included in the first cut to be synchronized with a fourth effect included in a third layer included in the first cut, other than the first layer.

In other exemplary embodiments, the effect input controller 213 may set a directing speed of an effect included in a layer to be changed from a first speed to a second speed in relation to a predetermined time. That is, the effect input controller 213 may set the directing speed of the second effect included in the first layer as the first speed when directing starts and as the second speed after the predetermined time. In this regard, the first speed or the second speed may be a speed that interacts with the directing of the first effect included in the first layer. That is, the effect input controller 213 may set the directing speed of the second effect included in the first layer as the first speed that interacts with the first effect at the directing start time and as the second speed that does not interact with the first effect after the predetermined time. The effect input controller 213 may also set the directing speed of the second effect included in the first layer as the first speed that does not interact with the first effect at the directing start time and as the second speed that interacts with the first effect after the predetermined time. In this regard, the predetermined time may be a middle time or middle point of total directing time of an effect. For example, when a total directing time is 100, the predetermined time may be set as one of 1 through 99 but is not limited thereto and may be set in various ways.

The cut generator 215 may generate a final cut by adding the input effect to the cut or layer. The cut generator 215 may generate the final cut such that the plurality of effects may interact with each other or may be synchronized and may be directed in consideration of the input effect and property information of the effect. That is, the cut generator 215 may generate a first final cut such that directing of the second effect may start simultaneously with directing of the first effect and the directing speed of the second effect may be directed at a speed interacting with the directing speed of the first effect. For example, when the first layer includes the first effect that is a moving effect and the second effect that is a rotation effect, and the directing speed of the second effect that is a rotation speed is set to be the same as the directing speed (moving speed) of the first effect, the cut generator 215 may control the directing speed of the second effect that is rotation included in the first layer, i.e. the rotation speed, to be synchronized with the directing effect that is movement included in the first layer, i.e. the moving speed. In this case, the cut generator 215 may generate the final cut such that the first layer may allow the rotation that is the second effect to be directed while the movement that is the first effect is directed by synchronizing the rotation speed of the second effect with the moving speed of the first effect, and the first layer may rotate by a moving distance according to the movement that is the first effect. That is, the cut generator 215 may allow the first layer to move by a circumference having a distance from a weight center of the first layer to an edge thereof as a radius when the first layer makes one rotation, and thus the moving effect and the rotation effect may be set to interact with each other.

The cut generator 215 may generate the final cut such that directing of an effect included in a layer may interact with directing of an effect included in a different cut or directing of an effect included in a different layer from the layer according to the input effect and the property information of the effect. For example, the cut generator 215 may generate the final cut such that the moving speed of the second effect that is the moving effect included in the first layer and the moving speed of the third effect that is a moving effect included in the second layer may interact with each other and be expressed, for example, the second effect and the third effect may simultaneously move or the third effect starts simultaneously when the second effect ends. The cut generator 215 may generate the final cut such that the directing of the second effect included in the first layer included in the first cut and directing of a fourth effect included in a third layer, other than the first layer, included in the first cut may interact with each other.

The cut generator 215 may generate the final cut such that the second effect included in the first layer may be directed at the first speed and, after a predetermined time, at the second speed according to the input effect and the property information of the effect. In this regard, one of the first speed and the second speed may be a speed interacting with the directing speed of the first effect included in the first layer. That is, the cut generator 215 may generate the final cut such that the second effect included in the first layer may be expressed at the speed interacting with the directing speed of the first effect and, after the predetermined time, at a speed that does not interact with the directing speed of the first effect. The cut generator 215 may generate the final cut such that the second effect included in the first layer may be expressed at the speed that does not interact with the directing speed of the first effect and, after the predetermined time, at the speed interacting with the directing speed of the first effect.

The display controller 216 may control to provide a user interface for generating cartoon content through the display unit 250. The display controller 216 may control to display the user interface for generating the cartoon content and adding a cut and a layer and display an effect setup menu that may be included in the layer.

The cartoon content generation apparatus 200 according to the exemplary embodiments may set an effect to one or more layers included in a cut, convert the respective layers that are to be reproduced including the effect, and generate a final cut including the converted layers.

Figure 4:
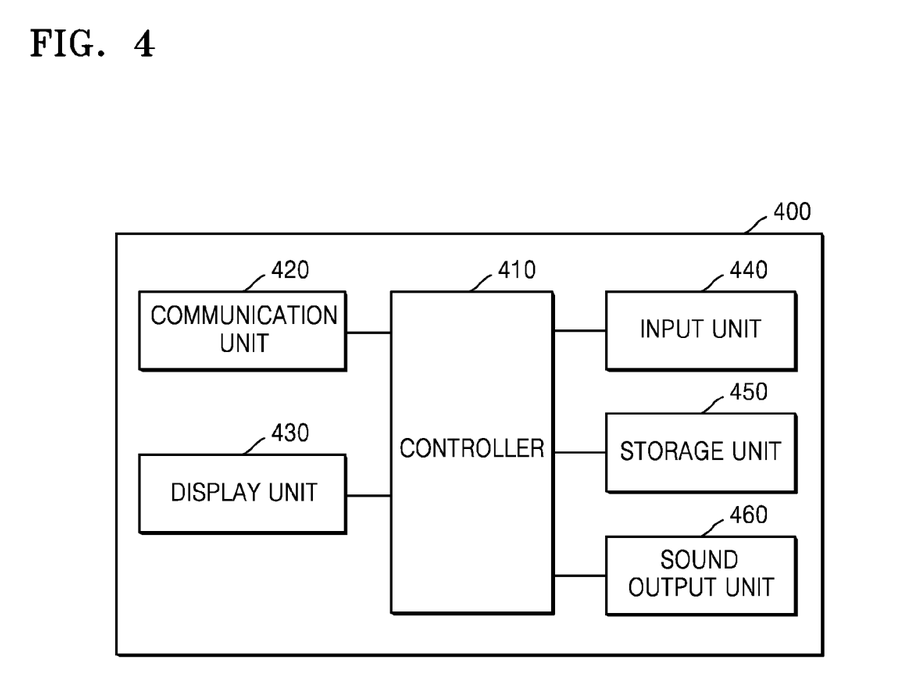
FIG. 4 is a block diagram of a cartoon content display apparatus according to an exemplary embodiment.

FIG. 4 is a block diagram of the cartoon content display apparatus 400 according to exemplary embodiments.

Referring to FIG. 4, the cartoon content display apparatus 400 includes a controller 410, a communication unit 420, a display unit 430, an input unit 440, a storage unit 450, and a sound output unit 460.

The controller 410 may control to display cartoon content through the display unit 430. The controller 410 may control to appropriately display the cartoon content generated by the cartoon content generation apparatus 200. That is, the controller 410 may control to display the cartoon content generated by the cartoon content generation apparatus 200 as set by a cartoonist.

In alternative exemplary embodiments, the controller 410 may control a moving speed or distance of the cartoon content such that one or more cuts included in the cartoon content, one or more layers included in the cut, and an effect applied in a layer or cut unit may be appropriately displayed.

The controller 410 may control directing start time and directing speed of a first effect and a second effect that are included in a layer such that directing of the first effect and the second effect may interact and be displayed.

The controller 410 should be understood to include various types of devices capable of processing data, e.g., a processor for controlling overall operations of the cartoon content displaying apparatus 400. Here, the processor may be a data processing device embedded in hardware and having a circuit physically constructed to execute, for example, code included in a program or a function expressed in the form of a command. Examples of the data processing device embedded in hardware include, but are not limited to, a microprocessor, a central processing unit (CPU), a processor core, a multiprocessor, an application-specific integrated circuit (ASIC), a field programmable gate array (FPGA), etc.

The communication unit 420 may include one or more components that enable communication between the cartoon content display apparatus 400 and the cartoon content server 100. For example, the communication unit 4220 may include a short-distance wireless communication unit or a mobile communication unit. Examples of the short-range wireless communication unit may include, but are not limited to, a Bluetooth communication unit, a Bluetooth low energy (BLE) communication unit, a near-field communication unit, a WLAN (Wi-Fi) communication unit, a Zigbee communication unit, an infrared data association (IrDA) communication unit, a Wi-Fi direct (WFD) communication unit, a ultra-wideband (UWB) communication unit, an Ant+ communication unit, etc. The mobile communication unit may exchange a radio signal with at least one among a base station, an external terminal, and a server in a mobile communication network. The radio signal may include a voice call signal, a video communication call signal, or various types of data via transmission and reception of text/multimedia messages. The communication unit 420 may communicate with the cartoon content server 100 to obtain the cartoon content or an application for displaying the cartoon content from the cartoon content server 100.

The display unit 430 may display the cartoon content and display the cartoon content by moving the cartoon content in correspondence with the user event with respect to the cartoon content. The display unit 430 may display the cartoon content by moving the cartoon content according to the moving speed and distance in consideration of the user event and the property information of the cartoon content. Meanwhile, when the display unit 430 is configured with a touch screen in which a touch pad forms a layer structure, the display unit 430 may be used as an input device in addition to an output device. The display unit 430 may include at least one of a liquid crystal display (LCD), a thin film transistor-liquid crystal display (TFT-LCD), an organic light-emitting diode (OLED) display, a flexible display, a 3D display, and an electrophoretic display.

The input unit 440 may be used by a user to input data for controlling the cartoon content display apparatus 400. For example, the input unit 440 may include a key pad, a dome switch, a touch pad (of a contact capacitive type, a press resistive type, an infrared sensing type, a surface ultrasonic conductive type, an integration tension measurement type, or a piezo effect type), a jog wheel, a jog switch, etc. but is not limited thereto.

The input unit 440 may obtain a user input. For example, the input unit 440 may obtain a user event with respect to the cartoon content, a scroll input, a direction key input, a movable touch input having a predetermined direction.

The storage unit 450 may store the cartoon content obtained through the communication unit 420.

The sound output unit 460 may output audio data received from the communication unit 420 or stored in a memory. The sound output unit 460 may output sound signals relating to effect sound and background sound included in the cartoon content. The sound output unit 460 may include a speaker, a buzzer, etc.

The sound output unit 460 may further include a vibration motor (not shown). The vibration motor may output a vibration signal. For example, the vibration motor may output the vibration signal corresponding to an output of audio data or image data (for example, the effect sound and the background sound included in the cartoon content). The vibration motor may also output the vibration signal when a touch is input to the touch screen.

Figure 5:
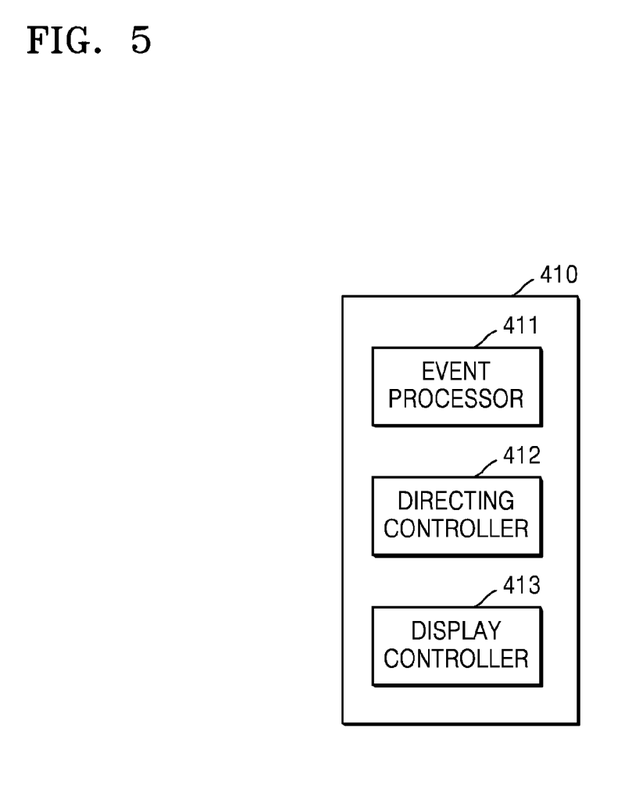
FIG. 5 is a block diagram of a controller of FIG. 4.

FIG. 5 is a block diagram of the controller 410.

Referring to FIG. 5, the controller 410 includes an event processor 411, a directing controller 412, and a display controller 413.

The event processor 411 may calculate a moving distance or speed of cartoon content corresponding to a user event that is input through the input unit 440 or process the user event according to the calculated moving distance of speed. The event processor 411 may calculate a moving speed or distance of a cut included in a display region in correspondence with the user event. The event processor 411 may calculate the moving distance or speed of the cartoon content in correspondence with the user event and allow the cartoon content to move at the moving speed by the moving distance. The event processor 411 may calculate the moving speed or distance in consideration of input time and direction of the user event, i.e., a scroll input, a direction key input, and a movable touch input.

The directing controller 412 may control directing of each of one or more effects included in a layer included in a cut included in a display region displayed through the display unit 430 in consideration of directing start time, directing end time, and/or directing speed of the effects. The directing controller 412 may calculate directing start time and/or directing speed of a second effect such that a first effect and the second effect included in the layer may interact with each other. For example, the directing controller 412 may calculate the directing start time and/or the directing speed of the second effect such that the first effect that is a moving effect and the second effect that is a rotation effect that are included in the layer may interact with each other, for example, the first effect and the second effect may continuously rotate while the layer moves or the first effect and the second effect may rotate by a distance moved by the layer.

The directing controller 412 may calculate directing start time and/or directing speed of effects included in two or more different layers such that the effects may interact with each other. In more detail, the directing controller 412 may calculate directing start time and/or directing speed of a second effect included in a layer such that the directing start time and/or the directing speed of the second effect may interact with directing of a third effect included in a second layer. For example, the directing controller 412 may calculate the same directing start time of the second effect included in a first layer as the directing start time of the third effect included in the second layer different from the first layer or the same directing speed of the second effect as the directing speed of the third effect such that the second effect included in the first layer may be simultaneously directed with the third effect included in the second layer. In this regard, the second layer may be included in the same cut as the first layer or in a different cut from the first layer.

The display controller 413 may control the first effect and the second effect that are included in the layer included in the cut included in the display region to be displayed at the calculated directing speed while moving the cartoon content by the moving distance calculated by the event processor 411.

The display controller 413 may control the directing start time and/or the directing speed of the second effect included in the first layer included in the cut included in the display region and the third effect included in the second layer such that the second effect and the third effect may be synchronized and displayed. That is, the display controller 413 may control the layer or the cut including the interacting second effect and third effect to interact with each other and to be displayed.

Figure 6:
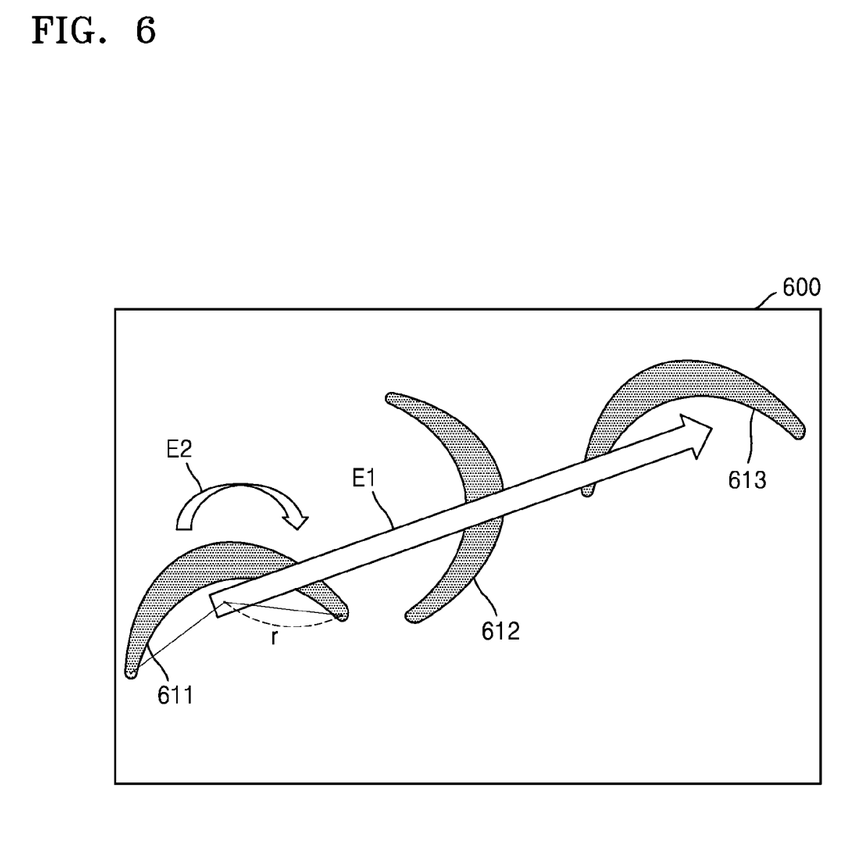
FIG. 6 is a diagram for describing a directing speed that interacts between a first effect and a second effect that are included in a layer.

FIG. 6 is a diagram for describing a directing speed that interacts between a first effect and a second effect that are included in a layer.

As shown in FIG. 6, when one cut includes a layer 611 (a boomerang) including a moving effect E1 and a rotation effect E2, the cartoon content generation apparatus 200 according to the exemplary embodiments may generate a cut 600 such that a directing speed of the moving effect E1 and the rotation effect E2 that are included in the layer 611 (the boomerang) may rotate so that the boomerang appears to actually move as if flying. Accordingly, the cartoon content generation apparatus 200 according to the exemplary embodiments may generate 2D cartoon content and further maximize a 3D animation effect. That is, the layer 611 moves and rotates and finally ends up as a layer 613 via a layer 612.

Figure 7:
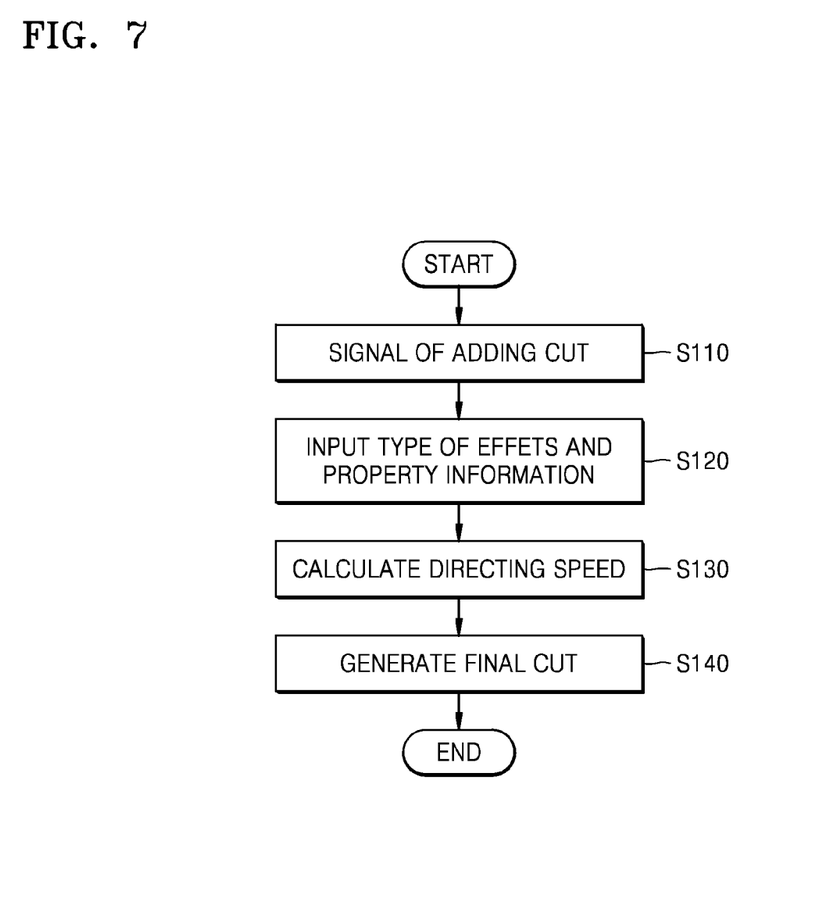
FIG. 7 is a flowchart of a cartoon content generation method according to an exemplary embodiment.

FIG. 7 is a flowchart of a cartoon content generation method according to an exemplary embodiment.

Referring to FIG. 7, the cartoon content generation method according to the exemplary embodiment includes an operation S110 of inputting a cut adding signal, an operation S120 of inputting a type of an effect and property information, an operation S130 of calculating a directing speed, and an operation S140 of generating a final cut.

In operation S110, the cut input controller 211 controls to receive the cut adding signal that adds one or more cuts to cartoon content from a user. In this regard, a cut may include one or more layers, and a first layer among the one or more layers may include two or more effects.

In operation S120, the effect input controller 213 receives types of two or more effects that are to be applied to layers included in the added cuts and/or property information of the two or more effects. In this regard, the effect input controller 213 may receive the property information indicating that the two or more effects included in the layers may interact with each other. For example, when the received property information indicates that a moving effect and a rotation effect are applied to the layers, directing a start time of the moving effect and the rotation effect that are included in the layers may be set as "simultaneous start" and/or directing a speed thereof may be set as "interacting with each other" so that the cartoon content generation apparatus 200 may synchronize a moving speed of the moving effect and a directing speed of the rotation effect.

In operation S130, the effect input controller 213 calculates a directing speed of each of the two or more effects included in the layers such that the two or more effects may interact with each other. When a total three effects including a first effect that is a fall effect, a second effect that is a moving effect, and a third effect that is a rotation effect are applied to one layer, the effect input controller 213 may calculate a directing speed of the first effect to increase according to the acceleration of gravity, a directing speed of the second effect corresponding to the directing speed of the first effect, and a directing speed of the third effect by calculating a rotation number corresponding to a moving speed of the second effect.

In operation S140, the cut generator 215 generates the final cut such that the cuts may be expressed according to the input effects and the property information thereof. That is, the cut generator 215 may generate the final cut such that the two or more effects included in the layers may interact with each other and be displayed.

Figure 8:
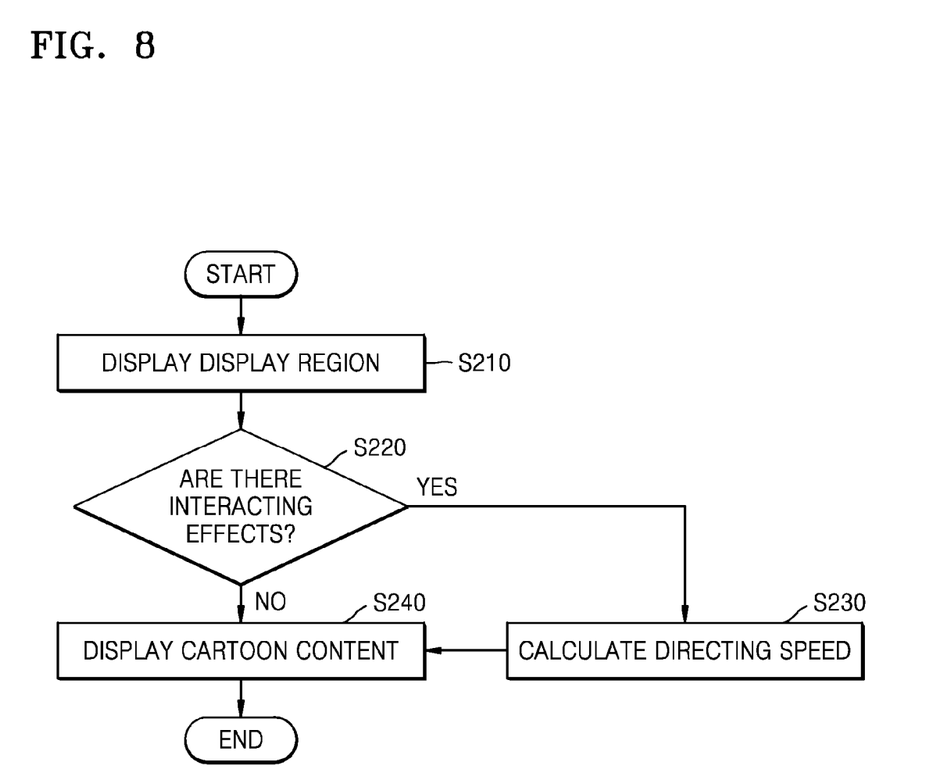
FIG. 8 is a flowchart of a cartoon content display method according to exemplary embodiments.

FIG. 8 is a flowchart of a cartoon content display method according to an exemplary embodiment.

Referring to FIG. 8, the cartoon content display method includes an operation S210 of displaying a display region, an operation S220 of determining whether interacting effects are present, an operation S230 of calculating a directing speed, and an operation S240 of displaying cartoon content.

In operation S210, the cartoon content display apparatus 400 moves the cartoon content in correspondence with a user event input through the display controller 412 and display a part of the cartoon content.

In operation S220, the directing controller 412 determines whether the interacting effects are present among one or more effects included in a cut or a layer included in the display region. The directing controller 412 may check directing start time and/or directing speed information among property information of the effects, and, when the directing start time and/or directing speed information set to interact with directing of a different effect is present, determine that the interacting effects are present.

When the interacting effects are present, in operation S230, the directing controller 412 calculates directing speed of interacting first effect and second effect. The directing controller 412 may calculate the directing start time and/or the directing speed of the second effect such that the first effect that is a moving effect and the second effect that is a rotation effect that are included in the layer may interact with each other, for example, the first effect and the second effect may continuously rotate while the layer moves or the first effect and the second effect may rotate by a distance moved by the layer.

In operation S240, the displaying controller 413 controls the directing start time and/or the directing speed of the second effect included in a first layer included in the cut included in the display region and a third effect included in a second layer such that the second effect and the third effect may be synchronized and displayed.

As described above, according to the one or more of the above exemplary embodiments, cartoon content may be generated as intended by a cartoon content creator.

A plurality of effects included in one layer among cartoon content may interact with each other, thereby easily generating various effects.

The one or more of the above exemplary embodiments may be embodied as a computer program that can be executed in a computer using various components. The computer program may be recorded on a computer-readable recording medium. Examples of the computer-readable recording medium may include a magnetic recording medium (a hard disc, a floppy disc, a magnetic tape, etc.), an optical recording medium (a CD-ROM, a DVD, etc.), a magneto-optical medium (e.g., a floptical disk), and a hardware device (e.g., a ROM, a RAM, a flash memory, etc.) specially designed to store and execute program commands. Furthermore, the computer-readable recording medium may be a formless medium that can be transmitted and distributed in a network, e.g., software or an application.

The computer program may be designed and configured specially for the inventive concept or would be obvious to those of ordinary skill in the field of computer software. Examples of the computer program include not only machine language codes prepared by a compiler but also high-level language codes executable by a computer using an interpreter.

The use of the terms 'a', 'an', and 'the' and similar referents in the context of describing the inventive concept (especially in the context of the following claims) are to be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein.

Finally, the operations of all methods described herein can be performed in an appropriate order unless otherwise indicated herein or otherwise clearly contradicted by context. The inventive concept is not limited by an order in which the operations are described herein. The use of any and all examples, or exemplary language (e.g., "such as") provided herein, is intended merely to clearly describe the inventive concept and does not pose a limitation on the scope of the inventive concept unless otherwise claimed. Numerous modifications and adaptations will be readily apparent to those skilled in this art without departing from the spirit and scope of the inventive concept.

It should be understood that exemplary embodiments described herein should be considered in a descriptive sense only and not for purposes of limitation. Descriptions of features or aspects within each exemplary embodiment should typically be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope of the inventive concept as defined by the following claims.

What is claimed is:

1. An apparatus for generating cartoon content, the apparatus comprising:
 a processor including a plurality of functional units for controlling the cartoon content, the functional units including,
  a cut input controller configured to control inputting of a signal for adding a cut having one or more layers;
  an effect input controller configured to control inputting of a plurality of effects applied to a first layer among the one or more layers and receiving of property information such that directing of the plurality of effects interact with each other; and
  a cut generator configured to determine at least one of a directing start time, a directing end time, and a directing speed of the plurality of effects such that the plurality of effects interact with each other and are displayed, and generate a first final cut such that the plurality of effects are expressed according to the property information,
 wherein the effect input controller enters an input that sets the property information of the plurality of effects so that the plurality of effects are synchronized, and
 wherein the cut generator generates the first final cut such that a directing start time, a directing end time, or a directing speed of a first effect among the plurality of effects is synchronized with a directing start time, a directing end time, or a directing speed of one or more others of the plurality of effects,
 wherein the effect input controller controls receiving of a third effect applied to a second layer among the one or more layers, and
 wherein the cut generator generates a second final cut such that the second layer expresses the third effect in order to interact the third effect with at least one of the first effect and the second effect.

2. An apparatus for generating cartoon content, the apparatus comprising:
 a processor including a plurality of functional units for controlling the cartoon content, the functional units including,
  a cut input controller configured to control receiving of a signal for adding a cut having one or more layers;
  an effect input controller configured to control receiving of a first effect and a second effect that are applied to a first layer among the one or more layers and receiving of a directing start time, a directing end time, or a directing speed of the first effect and the second effect; and
  a cut generator configured to generate a first final cut such that the first effect of the first layer interacts with the second effect while expressing the first effect,
 wherein the effect input controller enters an input that sets the directing speed of the second effect as a first speed that interacts with the directing speed of the first effect,
 wherein the cut generator generates the first final cut such that the directing speed of the second effect is directed as the first speed,
 wherein the effect input controller controls receiving of a third effect applied to a second layer among the one or more layers, and
 wherein the cut generator generates a second final cut such that the second layer expresses the third effect in order to interact the third effect with at least one of the first effect and the second effect.

3. The apparatus of claim 2, wherein, when the directing start time of the second effect is the same as the directing start time of the first effect, the effect input controller sets the directing speed of the second effect as a second speed synchronized with the directing speed of the first speed.

4. The apparatus of claim 2, wherein the directing speed of the second effect is changed from the first speed to the second speed that does not interact with the first effect after a time.

5. An apparatus for generating cartoon content, the apparatus comprising:

a processor including a plurality of functional units for controlling the cartoon content, the functional units including,
  a cut input controller configured to control receiving of a signal for adding a cut having one or more layers;
  an effect input controller configured to control receiving of a first effect and a second effect that are applied to a first layer among the one or more layers and receiving of a directing start time, a directing end time, or a directing speed of the first effect and the second effect; and
  a cut generator configured to generate a first final cut such that the first effect of the first layer interacts with the second effect while expressing the first effect,
  wherein the effect input controller enters an input that sets the directing speed of the second effect as a first speed that interacts with the directing speed of the first effect,
  wherein the cut generator generates the first final cut such that the directing speed of the second effect is directed as the first speed, and
  wherein the effect input controller receives a third effect applied to the first layer and receives an input that sets the directing speed of the second effect as a third speed that interacts with the directing speed of the first effect and the third effect.

6. A method of generating cartoon content, the method comprising:
  inputting, by a processor, a signal for adding a cut comprising one or more layers in a cut input controller;
  inputting, by the processor, a first effect and a second effect that are applied to a first layer among the one or more layers and a directing start time or a directing speed of the first effect and the second effect in an effect input controller; and
  generating, by the processor, a first final cut such that the first effect of the first layer interacts with the second effect while expressing the first effect, wherein a cut generator performs the generating,
  wherein the inputting of the first effect and the second effect includes inputting an input that sets the directing speed of the second effect as a first speed that interacts with the directing speed of the first effect,
  wherein the generating of the first final cut includes generating the first final cut such that the directing speed of the second effect is directed as the first speed,
  wherein the inputting of the first effect and the second effect comprises receiving a third effect applied to a second layer among the one or more layers, and
  wherein the generating of the first final cut comprises generating a second final cut such that the second layer expresses the third effect in order to interact the third effect with at least one of the first effect and the second effect.

7. The method of claim 6, wherein the inputting of the first effect and the second effect comprises, when the directing start time of the second effect is the same as the directing start time of the first effect, setting the directing speed of the second effect as a second speed synchronized with the directing speed of the first speed.

8. The method of claim 6, wherein the directing speed of the second effect is changed from the first speed to the second speed that does not interact with the first effect after a time.

9. The method of claim 6, wherein the directing speed of the second effect is changed from a second speed that does not interact with the first effect to the first speed after a time.

* * * * *